UNITED STATES PATENT OFFICE.

WILLIAM H. GRIMDITCH, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

PROCESS OF MAKING STORAGE-BATTERY PLATES.

1,374,076. Specification of Letters Patent. Patented Apr. 5, 1921.

No Drawing. Application filed July 24, 1920. Serial No. 398,696.

*To all whom it may concern:*

Be it known that I, WILLIAM H. GRIMDITCH, a subject of the King of Great Britain and Ireland and the Isle of Man, who has declared his intention of becoming a citizen of the United States, residing in Philadelphia, Pennsylvania, have invented Processes of Making Storage-Battery Plates, of which the following is a specification.

One object of this invention is to provide a novel succession of steps whereby it shall be possible to make storage battery plates and more especially positive plates, which shall be of uniform composition, particularly as regards the packing or density of active material, regardless of ordinary variations in the character of the lead oxid used; the method making it possible to fulfil the above requirements with the maintenance of the paste employed at the constant plasticity necessary for proper manipulation.

Another object of the invention is to provide a method of making storage battery plates of differing character for different purposes, from lead oxid of substantially uniform character.

In making up or pasting grids or frames with the oxids of lead generally used for making storage battery plates, it has been noted that even though the ingredients be apparently of the proper chemical composition and physical nature, there are certain differences in the characteristics of successive batches of the commercially made oxid which heretofore have caused a non-uniform product. More specifically, in using a mixture of red lead and ammonium sulfate solution, it has been noted that even though the specific gravity, purity and temperature of said solution, and the apparent chemical and physical nature of the red lead, as determined by the usual tests, be maintained constant, various batches of the red lead differ so materially that a mixture of these materials in the required proportions results in paste at one time too dry and at another time too moist, so that not only is pasting at times difficult or impossible, but the characteristics of the completed plate vary between wide limits.

As a result of many tests and prolonged observations, I have discovered that it is possible to obtain a constant plastic mixture or compound of red lead, or other lead oxids or mixtures thereof, with ammonium sulfate, sulfuric acid or other solution in their required proportions, having the consistency required for proper pasting, solely by temperature regulation, that is by warming or cooling the solution as used.

For example, with a definite volume and specific gravity of ammonium sulfate solution and a given weight of red lead, it is usually possible to make a paste of the standard and necessary consistency for properly pasting the grids or plates, by raising or lowering the temperature of said solution while maintaining the red lead at a substantially constant temperature. If, for example, with the required proportions of ammonium sulfate solution and red lead, the paste is found to be too wet or moist for proper pasting, said solution is heated, with the result that when mixed with the red lead, the paste formed is less moist. On the other hand, if the mixture of the above ingredients produces a paste which is too dry, the lowering of the temperature of the solution of ammonium sulfate will produce a moister, more plastic mixture, so that it is possible to quickly ascertain suitable temperatures to be used with different batches of red lead in order that the paste may be of such a nature as to permit of its proper application to the grids. The red lead ordinarily would be used at room temperature and the usual variations in this are to be understood as coming within what I mean by a substantially constant temperature. However, if desired, the red lead may be stored in a special room kept at any desired tempeature to minimize the variation in its temperature.

As a result of the above procedure, providing as it does for the use of a predetermined specific gravity and quantity of the pasting solution, the active material in the finished plates is uniform in character and has the desired capacity and life characteristics.

If it be desired to produce plates of differing character as to density, capacity, etc., from lead oxid of substantially uniform character, I utilize preferably a sulfate solution of predetermined constant specific gravity, at a given temperature, and vary the temperature of such solution to increase or decrease the quantity of solution required to make a paste of predetermined constant plasticity, when mixed in a standard manner with a given constant weight of the lead oxid; thereby varying the lead content per unit of volume of the paste as it is applied to the grid and correspondingly as it exists in the finished plate.

It is to be understood that without departing from my invention I may employ sulfuric acid or a solution of some sulfate other than ammonium sulfate, such as magnesium sulfate, it being noted that the term "sulfate solution" as used herein is intended to cover a solution of sulfuric acid or of a salt thereof.

By the above described process I have found it possible not only to simply and conveniently change the mechanical and electrical characteristics of the finished storage battery plates, but, on the other hand, to maintain said plate characteristics regardless of slight variations in the character of the lead oxid raw material as commercially made.

I claim:—

1. The method which consists in bringing the temperature of a given sulfate solution to a point such that a given quantity thereof, mixed with a given weight of lead oxid will produce a paste of predetermined constant plasticity; mixing the given quantity of said solution with a given quantity of the lead oxid; and applying the resulting paste to a storage battery grid.

2. The method which consists in determining the temperature necessary in a given quantity of a sulfate solution to produce, with a given weight of lead oxid, a mixture having a plasticity required for properly pasting a battery grid; mixing the given quantity of said solution at the determined temperature with the given quantity of the lead oxid; and applying the resulting paste to a battery grid.

3. The method which consists in determining the temperature necessary in a given quantity of a given ammonium sulfate solution to produce with a given weight of lead oxid containing red lead, a mixture having the plasticity required for properly pasting a battery grid; mixing the given quantity of said solution at the determined temperature with the given quantity of the lead oxid; and applying the resulting paste to a battery grid.

4. The method of making uniform storage battery plates from lead oxid which may vary in character and a sulfate solution of predetermined constant specific gravity, as tested at a given temperature, which consists in using a constant quantity of said solution and varying its temperature such that when mixed in a standard manner with a given constant weight of the lead oxid, a paste of predetermined constant plasticity will be produced; mixing the given quantity of said solution at the determined proper temperature with the given weight of the lead oxid; and applying the resulting paste to a storage battery grid.

5. The step in the method of making storage battery plates of differing character from lead oxid of substantially uniform character and a sulfate solution of predetermined constant specific gravity, as tested at a given temperature, which consists in varying the temperature of the solution to increase or decrease the quantity required to make a paste of predetermined constant plasticity, when mixed in a standard manner with a given constant weight of the lead oxid, and thus increase or decrease the lead constant per unit of volume of the paste as it is applied to the grid and correspondingly as it exists in the finished plate.

6. The step in the method of making storage battery plates from a powdered metallic oxid active material which consists in varying the temperature of the liquid used to make a paste with the powdered oxid to produce the desired character of resultant paste.

7. The step in the method of making storage battery plates from a powdered metallic oxid active material mixed to a paste with a liquid, which consists in varying the temperature of the liquid while keeping the powdered oxid at a substantially constant temperature, to produce the desired character of resultant paste.

WILLIAM H. GRIMDITCH.